United States Patent
Lam (10) Patent No.: US 10,260,368 B2
(45) Date of Patent: Apr. 16, 2019

(54) METHOD FOR STARTING A COMBUSTION SYSTEM

(71) Applicant: Siemens Aktiengesellschaft, Munich (DE)

(72) Inventor: Kam-Kei Lam, Heath (GB)

(73) Assignee: SIEMENS AKTIENGESELLSCHAFT, Munich (DE)

(*) Notice: Subject to any disclaimer, the term of this patent is extended or adjusted under 35 U.S.C. 154(b) by 534 days.

(21) Appl. No.: 14/763,628

(22) PCT Filed: Jan. 20, 2014

(86) PCT No.: PCT/EP2014/051043
§ 371 (c)(1),
(2) Date: Jul. 27, 2015

(87) PCT Pub. No.: WO2014/118029
PCT Pub. Date: Aug. 7, 2014

(65) Prior Publication Data
US 2015/0354458 A1 Dec. 10, 2015

(30) Foreign Application Priority Data
Feb. 1, 2013 (EP) .................................... 13153709

(51) Int. Cl.
*F01D 19/00* (2006.01)
*F02C 7/26* (2006.01)

(52) U.S. Cl.
CPC ............... *F01D 19/00* (2013.01); *F02C 7/26* (2013.01); *F05D 2260/85* (2013.01); *F23N 2027/02* (2013.01); *F23N 2041/20* (2013.01)

(58) Field of Classification Search
CPC .. F01D 19/00; F02D 41/0007; F02D 41/3035; F02D 41/062; F02C 7/26;
(Continued)

(56) References Cited

U.S. PATENT DOCUMENTS

| 4,464,895 A | 8/1984 | Morrison et al. |
| 5,212,943 A | 5/1993 | Harris |

(Continued)

FOREIGN PATENT DOCUMENTS

| EP | 1860302 A1 | 11/2007 |
| EP | 2104802 B1 | 8/2011 |

(Continued)

OTHER PUBLICATIONS

RU Official Decision of Grant dated Dec. 13, 2016, for RU patent application No. 2015131828.
(Continued)

*Primary Examiner* — Phutthiwat Wongwian
*Assistant Examiner* — Loren Edwards
(74) *Attorney, Agent, or Firm* — Beusse Wolter Sanks & Maire (57) ABSTRACT

A method for starting a combustion system having a first ignition device and an at least second ignition device, a processing unit and a sensor system. To obtain a reliable ignition the method includes as a starting sequence at least the following: monitoring during a working condition of the combustion system, an operational state of the first and the at least second ignition device by the sensor system; identifying a predefined state of the first and/or the at least second ignition device by the processing unit; and as a further step: in case of an identification of the predefined state changing in at least one parameter of at least one of the ignition devices by the processing unit. A combustion system is equipped to be operable with the method as well as to a flow engine with such a combustion system.

19 Claims, 5 Drawing Sheets

(58) Field of Classification Search
CPC ........ F02C 7/264; F02C 9/28; F05D 2260/85; F23N 2027/02; F23N 2041/20; F02P 23/04
USPC .......................................................... 60/776
See application file for complete search history.

(56) References Cited

U.S. PATENT DOCUMENTS

| | | | |
|---|---|---|---|
| 5,907,949 | A | 1/1999 | Falke et al. |
| 6,314,717 | B1 | 11/2001 | Teets et al. |
| 7,878,004 | B2 | 2/2011 | Davies et al. |
| 2004/0206091 | A1* | 10/2004 | Yee .......................... F23C 13/00 60/777 |
| 2007/0245745 | A1* | 10/2007 | Davies ...................... F02C 7/22 60/778 |
| 2008/0016875 | A1* | 1/2008 | Ryan ......................... F02C 7/26 60/776 |
| 2009/0049894 | A1 | 2/2009 | Wilbrham |
| 2010/0126179 | A1* | 5/2010 | Botarelli ................. F01D 19/00 60/778 |
| 2010/0293960 | A1 | 11/2010 | Davies |
| 2013/0180260 | A1* | 7/2013 | Romig .................... F02C 7/262 60/776 |

FOREIGN PATENT DOCUMENTS

| | | |
|---|---|---|
| EP | 2085577 B1 | 5/2012 |
| RU | 2078971 C1 | 5/1997 |
| RU | 2243383 C2 | 12/2004 |
| WO | 2003014551 A1 | 2/2003 |
| WO | 2011154528 A1 | 12/2011 |

OTHER PUBLICATIONS

RU Office Action dated Aug. 10, 2016, for RU application No. 2015131828.

* cited by examiner

METHOD FOR STARTING A COMBUSTION SYSTEM

CROSS REFERENCE TO RELATED APPLICATIONS

This application is the US National Stage of International Application No. PCT/EP2014/051043 filed Jan. 20, 2014, and claims the benefit thereof. The International Application claims the benefit of European Application No. EP13153709 filed Feb. 1, 2013. All of the applications are incorporated by reference herein in their entirety.

FIELD OF INVENTION

The present invention relates to a method for starting a combustion system, particularly used in a flow engine, and to a combustion system equipped to be operatable with said method as well as to a flow engine with such a combustion system. In particular, the invention addresses the start reliability of flow engines, e.g. gas turbine engines, particularly with regards to achieving light up or ignition (i.e. achieving flame on).

ART BACKGROUND

Optimum ignition conditions for gas turbine engines are subject to variation between starts due to a variety of factors, e.g. ambient temperature, gas turbine temperatures, fuel calorific value, fuel content, pressures, repeatability of fuel and air delivery systems, etc. In a typical start system for a gas turbine engine one uses an auxiliary drive unit for driving the gas turbine and a control unit providing a start sequence in which gas turbine speed and fuel delivery are coordinated to provide a fuel/air mixture at an ignition device allowing a successful ignition.

In a typical start sequence, the speed of the gas turbine, which is during start driven by an auxiliary motor, and/or the fuel flow to the combustion system are progressively increased over a set period of time, the so called light-up window. The length of the light-up window is a function of the range of engine speeds at which starting is most likely to occur, typically between 5% and 20% of the rated engine speed and the accumulation rate of fuel in the combustor. During the light-up window a number of ignition opportunities appears, the actual number of which depends on the number of sparks that can be delivered per second by the igniter of the gas turbine engine and the length (duration) of the light-up window. Therefore one likes to have the light-up window as long as possible. However, the length of the light-up window is delimited by a number of factors. If, e.g. the turbine is accelerated too quickly the fuel injection system will not have enough time to provide a sufficient amount of fuel before the window of engine speeds at which starting is most likely to occur is exceeded. On the other hand, if the turbine is accelerated too slowly, it may happen that an amount of fuel inside the combustor is reached which could be dangerous to the engine while the turbine speed has still not reached the maximum speed within the light-up window. However, for example the acceleration rate of the turbine depends on the ambient conditions. On a cold day, a battery driven starter motor may not be capable of accelerating the engine quickly due to possible low power supply. On the other hand, on a very hot day, the same motor with the same battery may be capable of accelerating the engine very quickly. To cope with the mentioned limitations a compromise is typically required between maximizing the light-up window to cover for wide variations in the actual optimum window and minimizing the variation rate to increase the number of ignition opportunities (sparks) during the actual optimum window, without establishing a potentially dangerous fuel amount inside the combustion system during the light-up window. Such a start sequence for gas turbine engines is, e.g. described in US 2010/0293960 A1 or U.S. Pat. No. 7,878,004 B1.

In cases when the gas turbine has more than one burner the situation is even more complicated. A burner has a significant difference in a so called air flow pressure loss coefficient before (cold condition) or after (hot condition) it is ignited due to aerodynamic air blockage effects of the combusting hot burner. Generally speaking, a cold burner has a lower air pressure loss coefficient than a hot burner. Burners are optimized to have high ignition reliability within the designed ignition or light-up window of fuel to air ratio. However, due to the hot and cold burner loss coefficient difference the already ignited burner (s) has/have a higher loss coefficient and therefore less air will flow through this/these hot burner (s). Consequently, more air will flow to the unignited burner (s). This maldistribution of air between hot and cold burners in the engine causes the unignited burner (s) to have more air pass through and a higher air to fuel ratio. This effect force (s) the unignited burner (s) to operate outside the optimised ignition or light-up window and therefore in a failed and problematic engine start.

SUMMARY OF THE INVENTION

It is therefore a first objective of the present invention to provide a method of starting a combustion system, particularly used in a flow engine, comprising a first and an at least second ignition device, a processing unit and a sensor system by which the combustion system can be reliably ignited.

It is a further objective of the present invention to provide a combustion system comprising a first and an at least second ignition device, a processing unit and a sensor system, equipped to be operatable with the inventive method and which operates reliably. It is a third objective of the present invention to provide a use of such a combustion system of a flow engine and a forth objective of the present invention to provide a flow engine with such a combustion system.

These objectives may be solved by a method, a use, a combustion system and a flow engine according to the subject-matter of the independent claims. The depending claims as well as the specification define further developments of the invention.

According to a first aspect of the present invention, a method for starting a combustion system, comprising a first ignition device and an at least second ignition device, a processing unit and a sensor system, is presented, wherein the method comprises as a starting sequence at least the following steps: monitoring during a working condition of the combustion system an operational state of the first and the at least second ignition device by the sensor system; identifying a predefined state of the first and/or the at least second ignition device by the processing unit; and as a further step: in case of an identification of the predefined state changing in at least one parameter of at least one of the ignition devices by the processing unit.

Advantageously, the combustion system comprises a plurality of ignition devices including a first ignition device and an at least second ignition device. The fuel flow is advantageously an ignition fuel flow.

Due to the inventive matter a reliable operation of the combustion system can be provided. Furthermore, a starting process of the combustion system may be speed up, resulting in an efficient operation of the combustion system, e.g. operating in a flow engine, like a gas turbine. Additionally, an unwanted event during the starting process of the combustion system can be easily detected and neutralised. The invention is applicable to both gas and liquid engine starts.

The wording "as a starting sequence" is intended to mean, that the steps of the method are applied during a starting sequence and/or process of the combustion system. In this context an ignition device is intended to mean a device, which mediates, initiates, maintains and/or effects an ignition, particularly of a gaseous or liquid fuel. In particular, the ignition device is a burner. Furthermore, a processing unit is intended to mean a unit that is enabled to receive, to process and/or to forward at least one information and/or signal and which comprises at least a processor. The processing unit may comprise several hardware or software components.

Moreover, a sensor system is intended to mean a system with at least one sensor. The sensor may be any identification device feasible for a person skilled in the art, which for example is able to detect a flame, a temperature, a pressure, a volume, humidity, a distance, a motion or the like. By an embodiment with two sensors these sensors may operate according to the same functional principal or both sensors may operate differently. Advantageously, each ignition device is monitored by a separate sensor, thus highly accurate monitoring and/or measuring results may be obtained. In general, it would also be feasible that all ignition devices are monitored by the same sensor. Nevertheless, it must be ensured, that different operational states of the ignition devices can be monitored or detected.

A working condition of the combustion system represents a state of the combustion system when it is intended to work and in particular, a working state of combustion system or the flow engine, respectively. Further, an operational state of an ignition device is intended to mean an actual condition of the ignition device, like ignited, unignited, purged, unpurged, ready for use, unready for use etc. In this context a predefined state of an ignition device may be any operational or actual state of the ignition device that is defined beforehand of the starting sequence or as a result of at least one of a foregoing operation of the ignition device, combustion system, flow engine and/or one of the foregoing starting sequences by an operator and/or the processing unit.

A parameter of an ignition device may be any parameter practical for a person skilled in the art, like a flame, a temperature, a pressure, a volume, an amount of a medium, like fuel and/or air, a compound layout, humidity or the like. The term "by the processing unit" should be understood here as well as in the following text as identified, controlled and/or initiated by the processing unit.

In an embodiment the identifying of the predefined state is an identification of an unignited ignition device. Thus, an inefficient combustion state can be detected and adjusted so that the combustion system may operate more efficient. Hence, an event of ignition of the first ignition device and/or the at least second ignition device is monitored. Alternatively and/or additionally, the identifying of the predefined state is an identification of an ignited ignition device. As a result an actual condition that is advantageous for the operation of the combustion system can be ascertained.

Advantageously, the changing of at least one parameter is a changing of an amount of at least one medium. Thus, the detected predefined state and/or an actual state of at least one of the ignition devices can be changed and/or adjusted constructively simple. The medium may be any substance feasible for a person skilled in the art, like a fluid, a gas, a liquid fuel, a gaseous fuel, air, oxygen, nitrogen, inert gas etc. Advantageously, the changing of at least one parameter is a changing of an amount of fuel. This is of particular advantage as a proportioning of fuel may be easily done. Alternatively and/or additionally, the changing of at least one parameter may be a changing of an amount of air feed to at least one of the ignition devices. This can easily be done, because a delivery of air depends on a rotational speed of the flow engine.

The change of ignition fuel flow may be dependent on the number of ignition devices, in the plurality of ignition devices, at the predefined state. If it is known that all ignition devices have the same air flow or an assumed or predetermined air flow, then change of ignition fuel flow can be made dependent on the number of ignition devices ignited/unignited such that the fuel flow is adjusted to provide a fuel to air ration within a range in which the ignition devices are most likely to ignite. Thus an assumption can be made to increase or decrease the amount of fuel dependent on the number of ignited or unignited ignition devices.

At least one of the plurality of ignition devices may have a different air flow amount therethrough than at least one other ignition device. The changing of an amount of ignition fuel flow is such that the fuel to air ratio is in a range in which the ignition device different air flow amount is most likely to ignite.

The step of changing of an amount of ignition fuel flow is repeated until all the ignition devices are ignited.

The at least one of the plurality of ignition devices having a different air flow amount therethrough than at least one other ignition device may be by virtue of any one or more of the group comprising air flow differences between ignited and unignited ignition devices, a difference in geometry such as tolerance and a difference in air flow supply. Air flow differences between ignited and unignited ignition devices may be caused by thermal strains in hardware or different pressure differentials across ignited and unignited ignition devices.

According to a further embodiment the changing of at least one parameter is performed by a readjustment of at least one valve controlled by the processing unit. By this construction the at least one parameter can be changed structurally simple and quick. The term "readjustment" should be understood as opening or closing as well as any position of a valve inbetween. In particular, the changing of at least one parameter is performed by a readjustment of at least one fuel control valve controlled by the processing unit. Hence, a central device of the combustion system can be triggered for changing of the at least one parameter. Generally, it would be also possible to readjust at least one air valve.

In an advantageously embodiment of the invention one valve is adjusted for all ignition devices initiated by the processing unit; in other words only one valve feeding all ignition devices with at least one medium, like air or advantageously fuel, is adjusted. This results in a construction saving pieces, space, construction work and costs. For example, by adjusting the central fuel control valve, the amount of fuel for all ignition devices of the combustion system is increased. This amount is specifically selected to provide an unignited or cold ignition device with a fuel/air ratio, which is sufficient to allow an ignition of this unignited ignition device within the light-up or ignition window. But also the amount of fuel for the already ignited ignition device is increased, resulting in a slightly higher than optimal waste emission, like NOx or the like. Nevertheless, this effect is negligible in respect of the benefit of ignition reliability.

According to an alternative and beneficial embodiment a separate valve is adjusted for each ignition device. Hence, only the valve of the ignition device, for which the predefined state is detected, had to be adjusted. Consequently, the controlling of the combustion system may be performed more selective and/or refined in comparison with a system, where only one valve for all ignition devices is adjusted.

According to a further exemplary embodiment the first ignition device and the at least second ignition device are operating (operated) in dependency of each other. Consequently, they affect each other and may be controlled as an interacting unit by the central processing unit. Thus, an advantageously well controllable combustion process may be accomplished.

Moreover, the method further comprises at least the step of purging at least a part of the combustion system if the processing unit determines a predefined condition. Thus, undesired conditions and/or contaminations may be efficiently eliminated, which results in a reliable combustion system and/or starting sequence thereof. A part of the combustion chamber may be any device, piece, and/or structure that may be—negatively—affected during the starting sequence of the combustion system, like an ignition device, a medium inlet e.g. for fuel or cooling medium, a valve, a wall, a surface, an igniter or the like. In this context a predefined condition may be any condition feasible for a person skilled in the art, like an unignited ignition device, a contaminated part or piece of the combustion system etc.

In particular, the method further comprises at least the step of purging at least a part of the combustion system if the processing unit determines an unsuccessful ignition of at least one of the ignition devices. Hence, the part of the combustion system is again ready for use after the purging, which minimises the risk of failure or malfunctions during a next ignition. Moreover, the part of the combustion system is particularly an unignited burner, resulting in minimising and/or reducing the off-time of the combustion system and/or the flow engine. The purging of only one ignition device during an operation of the other ignition device (s) is for example possible by building extra separate purge air valves for each ignition device.

In general, it would be also possible to purge all ignition devices, after shutdown of the combustion system. By purging the combustion system the accumulated fuel can be driven out of the combustion system so that the start sequence can be repeated without the danger of damaging the flow engine due to excess fuel in the combustion system. Since the purging can be done rather quickly by just stopping the fuel delivery while the engine is still rotating, even in this alternative operating mode the start sequences can be repeated rather quickly.

Furthermore, the starting sequence is repeated after the purging. Due to this, the starting of the combustion system can be realised time-saving and efficient. Thus, in the inventive method of starting the combustion system a start sequence is used in which fuel delivery is coordinated so as to provide a fuel/air mixture at the ignition devices allowing a successful ignition. If a successful ignition has not occurred by the end of the start sequence, the unignited ignition device or flow engine is purged and, after the purging, the start sequence is repeated.

In a further step of the method the purging and the repeating of the starting sequence stops if a predetermined stop condition is reached. Hence, an operation of the system in a potentially infinite loop can be advantageously avoided. This stop condition may be any condition practical for a person skilled in the art, like a number of unsuccessful tries of ignition, a time period, an external signal and/or a suboptimal, critical, hazardous etc. condition of the combustion system and/or the flow engine. As an example of a stop condition, a present number of start sequences can be used, wherein the number shall not be exceeded. Therefore, a counter for unsuccessful tries is recording the events and initiates a stop of the starting/ignition sequence when the number of events exceeds the set value.

According to a further exemplary embodiment the purging and the repeating of the starting sequence stops if a successful ignition of the former unignited ignition device and/or of all ignition devices is detected, ensuring a durable and/or reliable operation of the combustion system and/or the flow engine.

According to a further aspect of the present invention, a combustion system comprising a first ignition device and an at least second ignition device, a processing unit and a sensor system, equipped to be operatable with the inventive method is provided. Due to this, a reliable combustion system can be used. Moreover, a starting process of the combustion system may be speed up, resulting in a proficient combustion system. In addition, an unwanted event during the starting process of the combustion system can be easily detected and neutralised. Further, such a combustion system can optimise fuel flow to match the higher air fraction of unignited ignition devices in order to keep the unignited ignition device air to fuel ration at a design value and within the optimum ignition or light-up window.

Favourably, the sensor system comprises at least one sensor, wherein the at least one sensor is a sensor out of the group consisting of an optical sensor, a thermocouple sensor, an ionisation sensor or a temperature sensor.

The sensor may be any optical, thermocouple, ionisation and/or temperature sensor feasible for a person skilled in the art. For example a burner tip thermocouple sensor, or an optical sensor, detect radiation in the spectrum of UV, Near IR, IR or Vis wavelength or any combination of wavelengths (UV/IR, IR/IR, IR3, UV/IR/Vis, IR/IR/Vis, IR/IR/IR/Vis) or a video device, like a web cam or an inter duct temperature sensor.

In a further advantageous embodiment the first ignition device and the at least second ignition device are operatable in dependency of each other. Accordingly, they affect each other and may be controlled as an interacting unit by the central processing unit. Thus, an advantageously well controllable combustion system may be accomplished.

According to a still further aspect of the present invention, a use of the combustion system in a flow engine is provided. Thus, the combustion system can be employed in a field where highly sophisticated solutions are requested.

According to a forth aspect of the present invention, a flow engine with an above described combustion system is provided As a result a widely deployable flow engine may be provided, which can be operated reliably and durably.

In this context a flow engine is intended to mean any engine or machine suitable for a person skilled in the art, e.g. a thermal heating plant, a gas turbine or an internal combustion engine.

The above-described characteristics, features and advantages of this invention and the manner in which they are achieved are clear and clearly understood in connection with the following description of exemplary embodiments which are explained in connection with the drawings.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustrations in the drawings are schematically. It is noted that in different figures, similar or identical elements are provided with the same reference signs.

Figure 1:
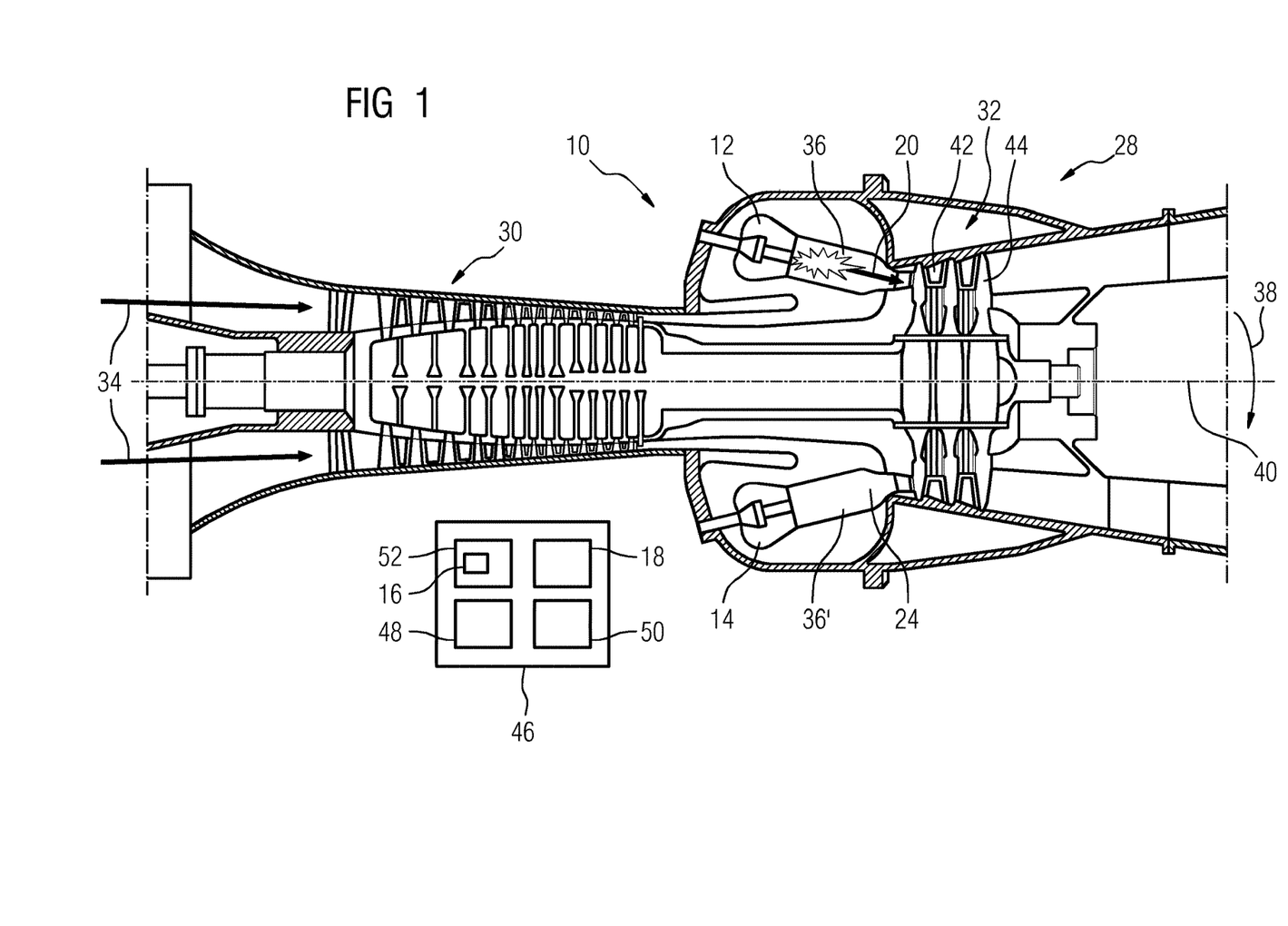
FIG. 1: shows a schematic view of a flow engine with an inventive combustion system comprising two depicted ignition devices, a processing unit and a sensor system.

FIG. 1 shows in a schematically view a flow engine 28, e.g. a gas turbine. The flow engine 28 comprises a compressor 30, a combustion system 10 and a turbine 32, which are arranged one after another in a flow direction 34 of a flow medium, e.g. air (see arrows pointing from left hand side to right hand side of FIG. 1). In the compressor 30 the incoming flow medium is compressed for application to one or more combustors of the combustion system 10. The combustion system 10 in this exemplary embodiment comprises several can-like combustion chambers 36, 36', which are separated by not shown walls and are arranged in circumferential direction 38 around an axis 40 of the flow engine 28 one after the other. Generally, it would be also possible to design the combustion system with a single annular combustion chamber extending in circumferential direction around the axis of the flow engine. Additionally, the combustion system may comprise several can-like combustion chambers followed in flow direction by an annular combustion chamber.

Each combustion chamber 36, 36' comprises an ignition device 12, 14, embodied as burner, wherein only two, exemplary named a first and a second ignition device 12, 14, are shown in FIG. 1. Fuel 20 is introduced into the combustion chambers 36, 36' and is there mixed with a part of the compressed flow medium leaving the compressor 30. Hot gases created by combustion in the combustion chambers 36, 36' are directed to the turbine 32 having a set of turbine blades 42, being guided in the process by a set of guide vanes 44, and the turbine blades 42 and the shaft forming the axis 40 are turned as a result. The turbine blades 42 in turn rotate blades of the compressor 30, so that the compressed flow medium is supplied by the flow engine 28 itself once this is in operation.

The combustion system 10 further comprises a control device 46 for controlling a start of the flow engine 28, which is depicted for better presentability schematically outside the flow engine 28. The control device 46 comprises a processing unit 16, a sensor system 18, a signal generator 48 and a counter 50. The processing unit 16 is connected to the flow engine 28 to begin and control a start sequence in order to light up the combustion system 10 and thus the flow engine 28. The processing unit 16 is connected to the signal generator 48 for receiving the actual window for the start sequence from the signal generator 48, which is adapted to generate a signal representing a range of fuel to air ratios at which starting of the flow engine 28 is most likely to occur. In other words, the signal represents the ignition or light-up window for the start sequence. The signal generator 48 is adapted to begin a start sequence for the flow engine 28 and to vary, during the start sequence, the mixing ratio of a fuel to air mixture (see below).

The processing unit 16 comprises an ignition monitor 52, which monitors the success of the ignition sequence of each ignition device 12, 14 after the start sequence has finished and outputs an actual condition signal representing successful or unsuccessful light-up of each ignition device 12, 14. To detect successful or unsuccessful light-up the ignition monitor 52 is connected to the sensor system 18. All units of the control device 46 may be realised as hardware or software.

Figure 2:
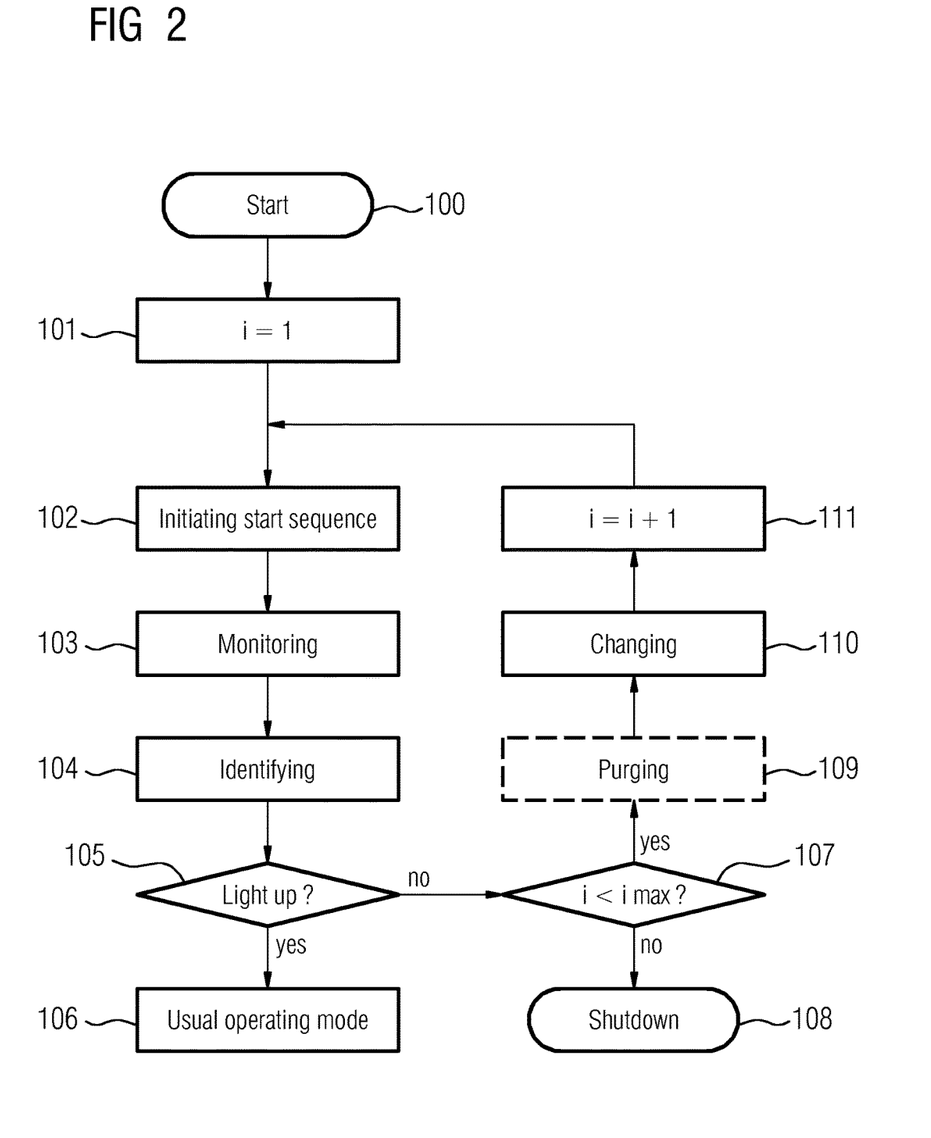
FIG. 2: shows a flow diagram describing the steps of the inventive method.
Figure 3:
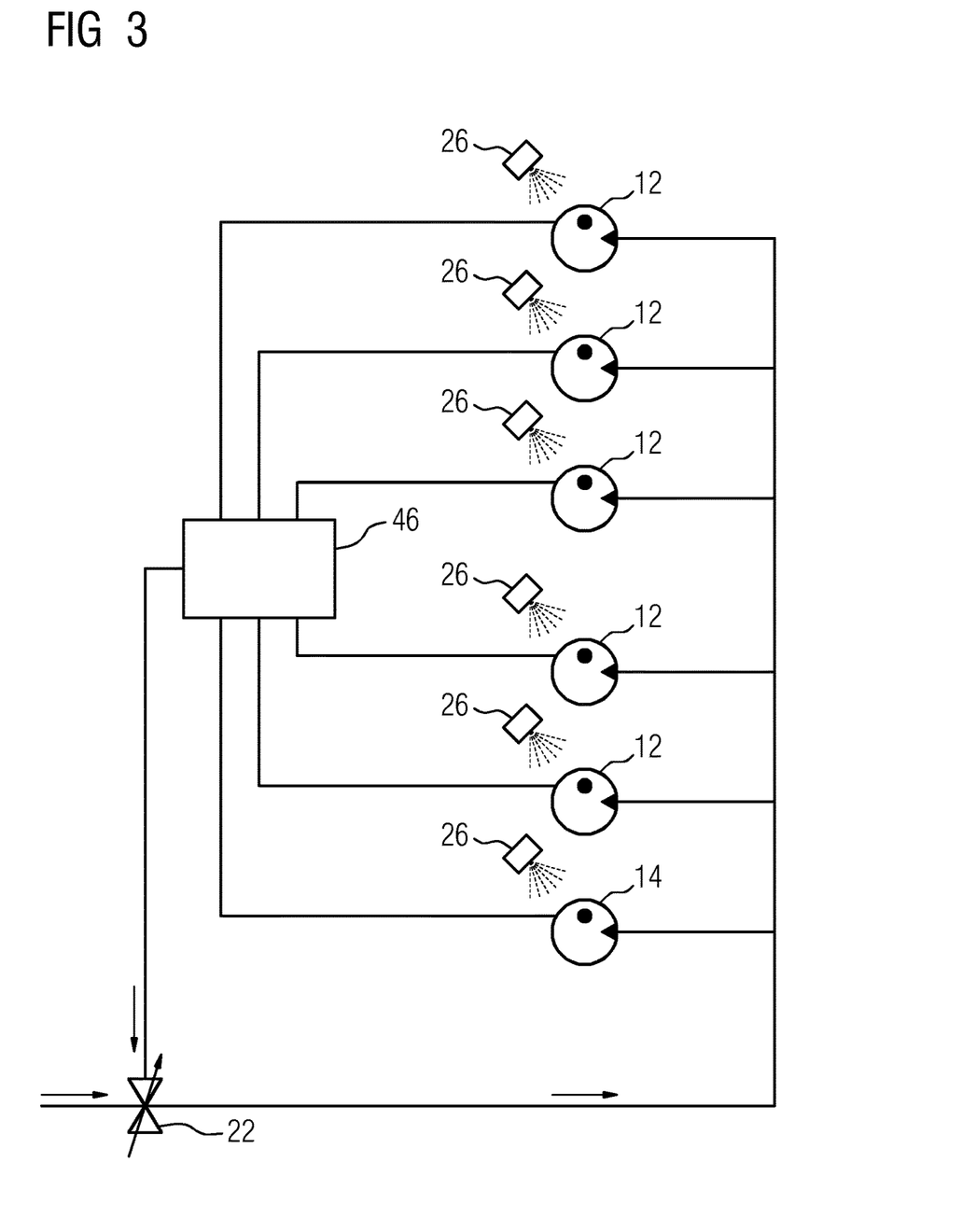
FIG. 3: shows the combustion system of FIG. 1 operated with six ignition devices in a schematic view.

The control device 46 for controlling the start of the flow engine 28 is suitable for performing the inventive method, which will be explained in the following text with the flow diagram shown in FIG. 2 and the sketch of FIG. 3, which shows an operating arrangement of the combustion system 10 with six ignition devices 12, 14.

Upon starting the method in step 100, the counting value i is set to 1 in step 101 and a start sequence is initialised in step 102. Initialising 102 the starting sequence contains setting a range of fuel to air ratio to a value at which starting 100 is most likely to occur. This value may be stored in the processing unit 16 or the signal generator 48 and may be for example an input of an operator beforehand of the operation and/or may be a result from a starting sequence performed prior to the current starting sequence. During the start sequence and/or a working condition of the combustion system 10, the sensor system 18 and the ignition monitor 52 are monitoring in a step 103 an operational state and/or the ignition of each ignition device 12, 14 of the flow engine 28. For this the sensor system 18 comprises for each ignition device 12, 14 a separate sensor 26, which is an optical sensor (see FIG. 3). Thus, as the start-up ignition is a very short time process, a sensor with a fast response may be used. Generally, it would be also possible to use a thermocouple sensor that is inexpensive, reliable and less failure sensitive.

In a following step 104 the processing unit 16 is identifying a predefined state of all ignition devices 12, 14. In this embodiment the identifying 104 of the predefined state is an identification of an ignition or a light-up state 105 of each ignition device 12, 14 separately. If identifying 104 of the predefined state results in an identification of—in this embodiment (see FIG. 3)—six ignited ignition devices 12, 14 or a successful ignition for all ignition devices 12, 14 the flow engine 28 is transferred into its usual operating mode in step 106.

If the identifying 104 of the predefined state is an identification of a predefined condition, namely of an unsuccessful ignition of at least one ignition device 14, and/or an identification of at least one unignited ignition device 14 (see FIG. 1) and/or no successful light-up 105 is detected for at least one ignition device 14 by the end of the start sequence, it is checked in step 107 whether the counting value i is still smaller than a maximum counting value $i_{max}$. In case of no, the method is terminated and a shutdown of the flow engine 28 is performed in step 108. If the counting value i is still smaller than the maximum counting value $i_{max}$ a purging signal is output by the processing unit 16 to the flow engine 28 in step 109 to purge at least a part 24 of the combustion system 10. According to this exemplary embodiment only the unignited ignition device 14 is purged. This may be done by an extra separate purge air valve, with which each ignition device 12, 14 is equipped (not shown).

If the purging 109 is executed over a certain time period, the end of the time period may indicate the end of the purging 109. If a time period for the purging 109 is not fixed, the purging 109 may be finished when it is detected that the fuel content in the combustor has fallen under a certain level or condition. In general, it would be also feasible to omit the purging step, thus in FIG. 2 the block of step 109 is depicted in dashed lines.

In case of an identification of the predefined state, namely an unignited ignition device 14, a step 110 of changing one parameter of the ignition device 14 is initiated by the processing unit 16. Therefore, it causes the signal generator 48 to generate another start sequence. In this exemplary embodiment the changing 110 of the parameter is a changing of an amount of medium and/or an amount of fuel 20 fed to the ignition devices 12, 14. The changing 110 of the parameter and/or the amount of fuel 20 is performed by a readjustment of a valve 22, which is embodied as a fuel control valve 22 and is controlled by the processing unit 16 (see FIG. 3).

Due to the adjustment of the fuel control valve 22 the amount of fuel 20 is adjusted for all ignition devices 12, 14 by the same valve 22. By adjusting the central fuel control valve 22, the amount of fuel 20 for all ignition devices 12, 14 of the combustion system 10 is increased. This amount is specifically selected to provide the unignited or cold ignition device 14 with a fuel to air ratio, which is sufficient to allow an ignition of this unignited ignition device 14 within the next light-up or ignition window. But also the amount of fuel 20 for the already ignited ignition devices 12 is increased (see specification of FIG. 4).

After the purging 109 and the changing 110 the new starting sequence is output to the processing unit 16, and the counting value i is increased by one in step 111. The method then returns to step 102, in which the new starting sequence is initiated. Hence, the starting sequence is repeated with the new/changed parameter to try another ignition of the until now unignited ignition device 14. The described method continues until all ignition devices 12, 14 are successfully lighted-up or the maximum counting value $i_{max}$ is reached (see above). Hence, all ignition devices 12, 14 are operating in dependency of each other.

To allow for finishing the repeating of starting sequences each signal to start a starting sequence and/or each purging signal output by the processing unit 16 to the flow engine 28 is also received by a software or hardware counter 50. Upon receiving a start and/or a purging signal the counter 50 counts up the number of performed start sequences and/or of purges. When a preset maximum count number of events is reached a stop signal is output from the counter 50 to the processing unit 16, which causes the processing unit 16 not to begin another start sequence or not to continue with the output of purging signals and to output a shutdown signal 108 to the flow engine 28.

Generally, it would be also possible that the purging signal causes the flow engine 28 to stop fuel delivery but to continue with delivery of air. Hence, excess fuel 20 accumulated in the ignition devices 12, 14 and the combustion chambers 36, 36' of the flow engine 28 is blown out of the flow engine 28 so that after the purging 109 no potentially dangerous fuel-to-air ratio is present in the combustion system 10. After purging 109 the flow engine 28 the processing unit 16 outputs another start sequence to the flow engine 28 to make another attempt to light-up the unignited ignition device 14.

Figure 4:
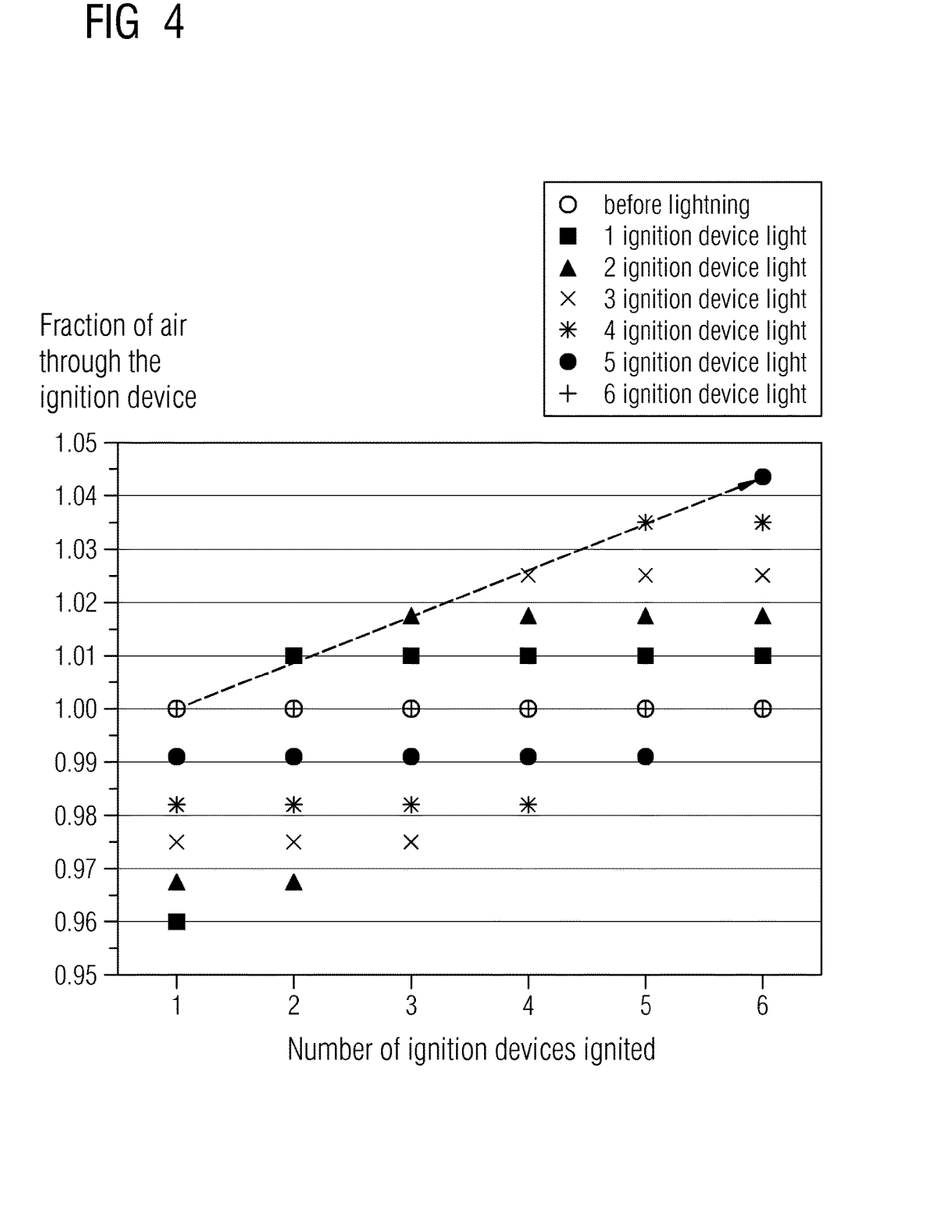
FIG. 4: shows a diagram depicting exemplary pattern of seven different igniting situations of the combustion system of FIG. 3 and FIG. 5: shows an alternative combustion system with a separate valve for each ignition device in a schematic view.

FIG. 4 shows a diagram depicting exemplary pattern of seven different igniting situations of the combustion system 10. The x-axis is the total number of ignition devices 12, 14 ignited per situation and on the y-axis the fraction of air through the ignition device is plotted. The ignition situations are: Before lightning (open cycles), one ignition device lighted (filled squares), two ignition devices lighted (filled triangles), three ignition devices lighted (crosses), four ignition devices lighted (asterisks), five ignition devices lighted (filled cycles) and six ignition devices lighted (plus symbols).

For illustration purpose, assume the fraction of air flowing through a hot ignited ignition device 12 is 0.95 of the cold unignited ignition device 14 and the optimal ignition fuel is 100 KW (Kilo-Watt) to the flow engine 28. When the flow engine 28 starts in step 100 the starting sequence all ignition devices 12, 14 are cold and have the same air amount, say a nominal design fraction of 1 (open cycles). Thus, the processing unit 16 just needs to command the nominal design fuel fraction of 1 (i.e. 100 KW to the flow engine 28).

For example, let us now look at five ignited ignition devices 12 (filled cycles). The five ignited ignition devices 12 have an air flow fraction of 0.9913. However, the sixth ignition device 14 is unignited and has a higher than design nominal air fraction, specifically of 1.0435. In this case, the processing unit 16 needs to adjust the fuel demand to 1.0435 times the nominal fuel input (i.e. 1.0435*100 KW=104.35 KW to the flow engine 28) in order to ensure that the sixth cold and unignited ignition device 14 is ignited at the nominal design fuel to air ratio and is able to ignite within the ignition or light-up window. This situation is depicted by an arrow, representing a fuel fraction increase in the ignition sequence to maintain an optimal ignition fuel to air ratio on (the) unignited ignition device (s). For the other situations the diagram can be read in an analogous fashion to the exemplary described situation. As can be seen from the diagram all ignition devices 12, 14 are operating in dependency of each other.

Figure 5:
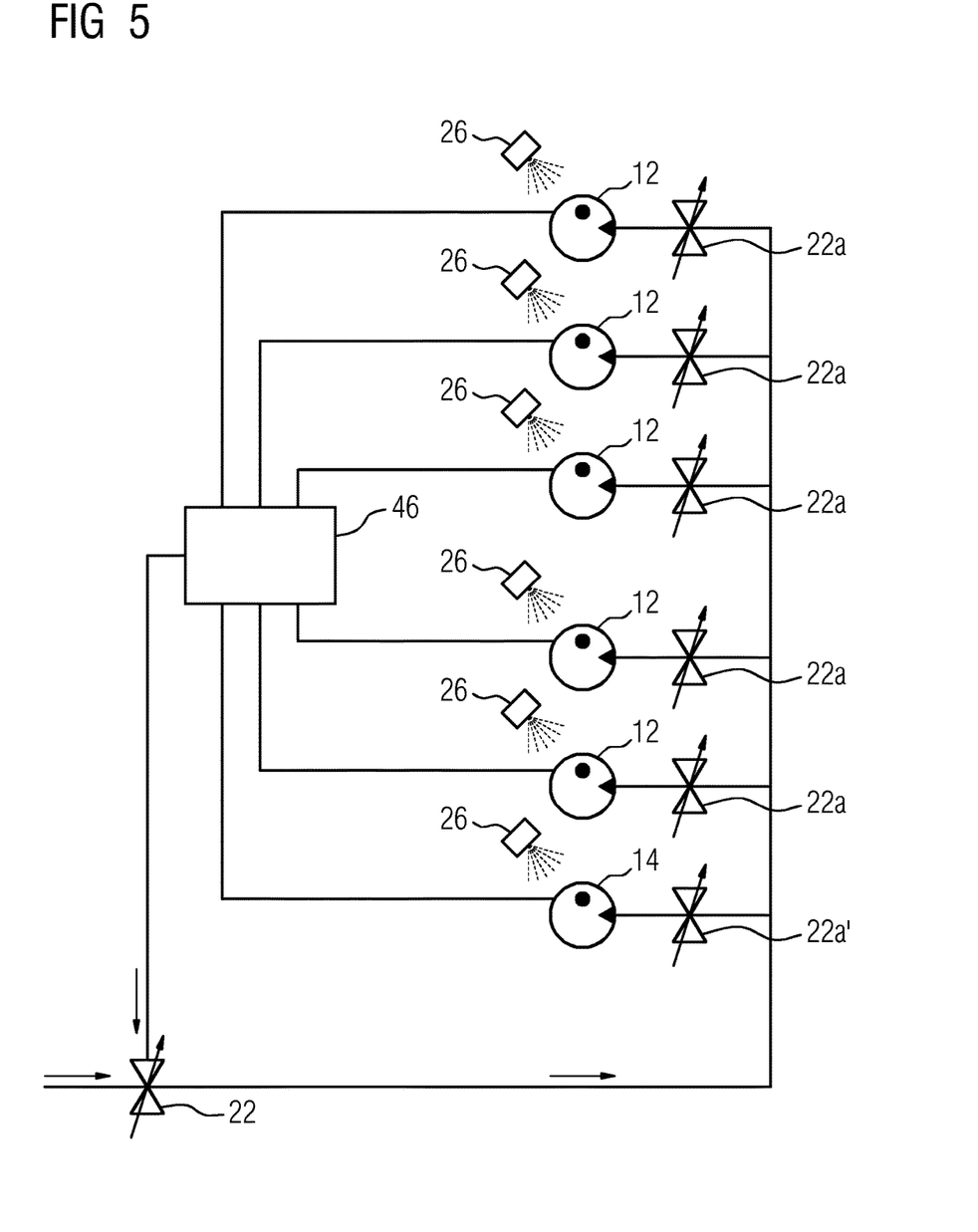

FIG. 5 shows an alternative exemplary embodiment of the combustion system 10. Identical components, features and functions are denoted by the same reference numerals. However, to distinguish the exemplary embodiment of FIG. 5 over that of FIGS. 1 to 4 the letter 'a' has been added to the reference numerals of the components that are designed differently in the exemplary embodiment of FIG. 5. The description below is substantially limited to these differences compared to the exemplary embodiment of FIGS. 1 to 4, wherein reference is made to the description of the exemplary embodiment in FIGS. 1 to 4 with respect to identical components, features, and functions.

A combustion system 10a shown in FIG. 5 differs from the combustion system 10 described in FIGS. 1 to 4 in that the combustion system 10a of FIG. 5 comprises for each ignition device 12, 14 a separate valve 22a, 22a' that is adjustable for changing an amount of medium, like fuel for a further ignition in case of an unsuccessful ignition. Hence, only the valve 22a' of an ignition device 14, for which the predefined state, specifically an unignited ignition device 14, is detected, had to be adjusted. In this embodiment the central fuel control valve 22 may be omitted.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the invention is illustrated and described in detail by the preferred embodiments, the invention is not limited by the examples disclosed, and other variations can be derived therefrom by a person skilled in the art without departing from the scope of the invention.

The invention claimed is:

1. A method for starting a combustion system, comprising a plurality of ignition devices comprising a first ignition device and an at least one second ignition device, an ignition fuel flow, and a control device, the control device comprising a processing unit, and a sensor system, the control device being configured to perform the method, wherein the method comprises as a starting sequence at least the following:
   monitoring during a working condition of the combustion system an operational state of the first ignition device and the at least one second ignition device by the sensor system;
   attempting unsuccessfully to light the at least one second ignition device;
   identifying a predefined state of the first ignition device as being ignited;
   identifying a predefined state of the at least one second ignition device by the processing unit as being unignited after attempting unsuccessfully to light the at least one second ignition device; and
   upon identification of the predefined state of the at least one second ignition device as being unignited, changing an ignition fuel flow of the at least one second ignition device by the processing unit while keeping the first ignition device ignited,
   wherein the changing of the ignition fuel flow is performed by a readjustment of at least one valve, controlled by the processing unit, and
   wherein a separate valve is adjusted for each ignition device.

2. The method according to claim 1,
wherein the changing of ignition fuel flow is dependent on a number of unignited second ignition devices of the at least one second ignition device.

3. The method according to claim 2,
wherein the at least one second ignition device comprises a different air flow amount therethrough when unignited than the first ignition device when ignited, and
wherein the changing of ignition fuel flow is such that a fuel to air ratio of the at least one second ignition device returns to a combustible mixture.

4. The method according to claim 3,
wherein the step of changing of ignition fuel flow is repeated until all unignited second ignition devices of the at least one second ignition device are ignited.

5. The method according to claim 3,
wherein the different air flow amount is by virtue of any one or more of the group comprising: air flow differences between ignited and unignited ignition devices, a difference in geometry, and a difference in air flow supply.

6. The method according to claim 1,
wherein the first ignition device and the at least one second ignition device are operating in dependency of each other.

7. The method according to claim 1,
wherein the method further comprises purging the at least one second ignition device when the processing unit determines an unsuccessful ignition of the at least one second ignition device while keeping the first ignition device ignited.

8. The method according to claim 7,
wherein after the purging the starting sequence is repeated.

9. A combustion system comprising
a first ignition device and at least one second ignition device, a processing unit and a sensor system, configured to implement the method according to claim 8.

10. The combustion system according to claim 9,
wherein the sensor system comprises at least one sensor wherein the at least one sensor is a sensor selected from the group consisting of an optical sensor, a thermocouple sensor, an ionisation sensor and a temperature sensor.

11. The combustion system according to claim 9,
wherein the first ignition device and the at least one second ignition device are operatable in dependency of each other.

12. The combustion system according to claim 9 configured use in a flow engine.

13. A flow engine with a combustion system according to claim 9.

14. The method according to claim 8, wherein the changing of ignition fuel flow comprises increasing a fuel flow to the at least one second ignition device without increasing a fuel flow to the first ignition device.

15. The method according to claim 8, further comprising:
wherein attempting to ignite the at least one unignited ignition device after selectively increasing the ignition flow of fuel to the at least one unignited ignition device occurs during a light-up window, and
wherein the light-up window occurs between 5% and 20% of a rated speed of the gas turbine engine comprising the combustion system.

16. A method for starting a combustion system comprising plural ignition devices, and a control device, the control device comprising a processing unit and a sensor system, the control device being configured to perform the method, the method comprising:
   igniting at least one ignition device of the plural ignition devices to create at least one ignited ignition device;
   failing to ignite at least one second ignition device of the plural ignition devices to create at least one unignited ignition device;
   identifying the at least one unignited ignition device of the plural ignition devices;
   determining an amount of an increase in airflow to the at least one unignited ignition device resulting from aerodynamic air blockage effects of the at least one ignited ignition device;
   selectively increasing an ignition flow of fuel to the at least one unignited ignition device while the at least one ignited ignition device continues to burn to compensate for the increase in airflow to the at least one unignited ignition device, and
   attempting to ignite the at least one unignited ignition device after selectively increasing the ignition flow of fuel to the at least one unignited ignition device.

17. The method according to claim 16,
wherein under design conditions each ignition device of the plural ignition devices receives a respective fraction of an airflow entering the combustion system;

wherein the increase in airflow to the at least one unignited ignition device is measured as a percentage increase of a respective fraction; and wherein the increase in the ignition flow of fuel is a second percentage increase that equals the percentage increase in the respective fraction.

18. The method according to claim 16, wherein the at least one unignited ignition device comprises plural unignited ignition devices, the method further comprising:

determining a respective increase in airflow to each unignited ignition device; and selectively increasing a respective ignition flow of fuel to each unignited ignition device.

19. A method for starting a gas turbine engine comprising a compressor, a combustion system comprising plural can combustors, a turbine, and a control device, the control device comprising a processing unit and a sensor system, the control device being configured to perform the method, the method comprising:

igniting successfully at least one can combustor of the plural can combustors during a startup sequence configured to start the gas turbine engine;

attempting unsuccessfully to ignite at least one second can combustor of the plural can combustors during the startup sequence configured to start the gas turbine engine;

identifying the at least one can combustor as being at least one ignited can combustor;

identifying the at least one second can combustors as being at least one unignited can combustor;

determining an amount of an increase in airflow to the at least one unignited can combustor;

selectively increasing an ignition flow of fuel to the at least one unignited can combustor while the at least one ignited can combustor continues to burn to compensate for the increase in airflow to the at least one unignited can combustor, and attempting to ignite the at least one unignited can combustor after selectively increasing the ignition flow of fuel to the at least one unignited can combustor.

* * * * *